United States Patent
Heubner

(10) Patent No.: US 11,168,747 B2
(45) Date of Patent: Nov. 9, 2021

(54) HYDRAULIC GEARBOX ACTUATOR AND ASSEMBLY WITH SUCH A GEARBOX ACTUATOR AND A GEARBOX FOR A DRIVE TRAIN OF A MOTOR VEHICLE

(71) Applicant: FTE automotive GmbH, Ebern (DE)

(72) Inventor: Wilhelm Heubner, Ebern (DE)

(73) Assignee: FTE automotive GmbH, Ebern (DE)

(*) Notice: Subject to any disclaimer, the term of this patent is extended or adjusted under 35 U.S.C. 154(b) by 72 days.

(21) Appl. No.: 16/799,890

(22) Filed: Feb. 25, 2020

(65) Prior Publication Data

US 2020/0284305 A1 Sep. 10, 2020

(30) Foreign Application Priority Data

Mar. 4, 2019 (DE) .................. 10 2019 105 393.5

(51) Int. Cl.
*F16D 67/04* (2006.01)
*F16D 48/02* (2006.01)
(Continued)

(52) U.S. Cl.
CPC .............. *F16D 25/14* (2013.01); *F15B 15/18* (2013.01); *F16D 67/04* (2013.01);
(Continued)

(58) Field of Classification Search
CPC ............. F16H 61/0025; F16H 61/0031; F16H 57/0435; F16H 57/0436; F16H 57/0445;
(Continued)

(56) References Cited

U.S. PATENT DOCUMENTS 4,578,948 A 4/1986 Hutson et al.
4,676,336 A 6/1987 Hiramatsu et al.
(Continued)

FOREIGN PATENT DOCUMENTS

DE 10 2010 048 786 A1 7/2011
DE 10 2014 204 009 A1 9/2015
(Continued)

OTHER PUBLICATIONS

German Search Report dated Jan. 30, 2020 in German Application 10 2019 105 393.5, filed on Mar. 4, 2019 (with English Translation of Categories of Cited Documents & Written Opinion), 13 pages.

(Continued)

*Primary Examiner* — David R Morris
*Assistant Examiner* — Lori Wu
(74) *Attorney, Agent, or Firm* — Oblon, McClelland, Maier & Neustadt, L.L.P.

(57) ABSTRACT

A hydraulic gearbox actuator with a hydraulic pump which has a pump body wherein a rotor is arranged, wherein a drive motor is provided with which the rotor can be driven in opposite directions, wherein two working chambers which are separated from each other are formed in the pump body, the working chambers each having two openings, of which at least three openings are connected to a respective pressure supply circuit, the one side of which is connected to a reservoir and the other side of which is connected to one of three pressure outlets of the gearbox actuator.

10 Claims, 5 Drawing Sheets

(51) Int. Cl.
*F15B 15/18* (2006.01)
*F16H 61/00* (2006.01)
*F16D 121/04* (2012.01)
*F16H 57/04* (2010.01)

(52) U.S. Cl.
CPC ..... *F16H 61/0025* (2013.01); *F16D 2121/04* (2013.01); *F16H 57/0435* (2013.01); *F16H 57/0436* (2013.01)

(58) Field of Classification Search
CPC ...... F16H 57/0441; F15B 15/18; F04C 14/14; F04C 2/34; F16D 25/14; F16D 67/04; F16D 2121/04
See application file for complete search history.

(56) References Cited

U.S. PATENT DOCUMENTS

| | | |
|---|---|---|
| 6,386,836 B1 | 5/2002 | Johnson |
| 2011/0173965 A1 | 7/2011 | Holmes et al. |
| 2015/0030472 A1* | 1/2015 | Wi ...................... F16H 61/0025 417/286 |
| 2015/0068340 A1 | 3/2015 | Wi et al. |
| 2016/0325623 A1* | 11/2016 | Tsuchihashi ........... B60K 17/35 |
| 2018/0045302 A1* | 2/2018 | Schultz ................ G05D 16/106 |
| 2018/0135626 A1* | 5/2018 | Guo ........................ F04C 14/24 |
| 2019/0241058 A1 | 8/2019 | Grethel et al. |

FOREIGN PATENT DOCUMENTS

| | | |
|---|---|---|
| DE | 10 2015 112 671 A1 | 2/2017 |
| DE | 10 2015 218 784 A1 | 3/2017 |
| DE | 10 2016 214 932 A1 | 2/2018 |
| DE | 10 2016 220 964 A1 | 4/2018 |
| WO | WO 01/53724 A1 | 7/2001 |
| WO | WO 2015/090317 A1 | 6/2015 |

OTHER PUBLICATIONS

Extended European Search Report dated Apr. 14, 2020, in Patent Application No. 20160421.2, 5 pages.

* cited by examiner

HYDRAULIC GEARBOX ACTUATOR AND ASSEMBLY WITH SUCH A GEARBOX ACTUATOR AND A GEARBOX FOR A DRIVE TRAIN OF A MOTOR VEHICLE

BACKGROUND OF THE INVENTION

Field of the Invention

The invention relates to a hydraulic gearbox actuator which is suitable in particular for independently shifting a plurality of clutches of a manual gearbox, in particular of a planetary gearbox, as is used in the drive train of a motor vehicle.

Discussion of the Background

Gearbox actuators which have a hydraulic pump which in particular can be driven electrically are known. The hydraulic pump has two delivery outlets which are connected to a first and a second pressure outlet of the gearbox actuator and can supply a hydraulic fluid pressure and a hydraulic fluid flow to the pressure outlets. With the hydraulic fluid pressure and hydraulic fluid flow, two pressure pistons can be infinitely variably adjusted between an unactuated and an actuated position. The pressure pistons serve to actuate friction clutches which, for example, are part of the dual clutch gearbox.

In order to be able to control or regulate the pressure at the pressure outlets, a proportional valve is arranged between each delivery outlet and the associated pressure outlet.

The hydraulic pump can advantageously be designed as a roller cell pump or vane pump.

However, such a gearbox actuator can no longer be used if it is intended to be used to shift more than two clutches independently of one another. More than two clutches have to be shifted independently of one another with a further separating clutch towards the internal combustion engine, for example in the case of hybridized dual clutch gearboxes, or, in the case of gearboxes which have a plurality of planetary gear sets, of which one of the components from among the internal gear, sun gear and planetary carrier can be non-rotatably supported in a shiftable manner by means of a clutch or can be connected to another component and, in addition, an internal combustion engine and/or an electric motor can be connected or disconnected, as required.

In a specific application having a gearbox of the type shown, for example, in DE 10 2014 204 009 A1, a first clutch which connects the internal combustion engine to the drive train or releases same from the drive train has to be shifted. A first brake which is assigned to a first planetary gear set then has to be shifted. Furthermore, a second brake which is assigned to a second planetary gear set has to be shifted. Finally, a second clutch has to be actuated in order to shift a third gear stage.

SUMMARY OF THE INVENTION

It is the object of the invention to provide a gearbox actuator which has a simple design and permits more than two clutches to be actuated independently of one another.

In order to achieve this object, according to the invention a hydraulic gearbox actuator is provided, with a hydraulic pump which has a pump body in which a rotor is arranged, wherein a drive motor is provided with which the rotor can be driven in opposite directions, wherein two working chambers which are separated from each other are formed in the pump body, said working chambers each having two openings, of which at least three openings are connected to a respective pressure supply circuit, the one side of which is connected to a reservoir and the other side of which is connected to one of three pressure outlets of the gearbox actuator. The gearbox actuator according to the invention is based on the basic concept of operating the hydraulic pump in the one direction or the other direction depending on the pressure supply circuit which has to be supplied with pressure for the shifting. The function of the two openings of each working chamber changes here. That opening which is the delivery side of the pump in one direction of rotation of the drive motor and therefore of the rotor becomes the intake side in the opposite direction of operation of the rotor. The particular advantage of this gearbox actuator consists in that a pump body can be provided with four openings which can all act as the delivery side (although not simultaneously). Nevertheless, each working chamber of the hydraulic pump can extend over an angle of more than 90° in the circumferential direction. With the assumption that the two partitions between the working chambers are very thin, the working chambers can extend over an angular range of in each case virtually 180°. This results overall in a robust design and a high pumping capacity.

If the gearbox actuator has three pressure outlets, the fourth opening can be connected directly to the reservoir since it is not required for supplying pressure. If the hydraulic pump is operated in the direction such that the fourth opening is one of the two delivery sides, the corresponding working chamber conveys the hydraulic fluid in a (substantially) pressure-free manner in the circuit.

If the gearbox actuator has four pressure outlets, all of the openings are connected to a pressure supply circuit, the one side of which is connected to the reservoir and the other side of which is connected to one of four pressure outlets of the gearbox actuator. In this case, two of the pressure outlets are supplied with hydraulic fluid in a first direction of rotation of the drive motor and the two other pressure outlets are supplied therewith in a second direction of rotation of the drive motor.

In order to be able to precisely control or regulate the pressure at the corresponding pressure outlet of the gearbox actuator, it is preferably provided that a proportional valve is arranged in each pressure supply circuit between the opening and the pressure outlet.

According to a preferred embodiment, it is provided that the reservoir is divided into separate chambers, and each proportional valve has a return line which leads to the chamber of the reservoir from which the pressure supply circuit which is connected to the same working chamber of the pump draws. This ensures that, in the event of a leakage or defect in one of the pressure supply circuits or in a hydraulic circuit supplied by said pressure supply circuit, the entire hydraulic fluid is not lost through the defective pressure supply circuit, but rather the remaining pressure supply circuits and the hydraulic circuits supplied therewith still remain fully functional for some time, and therefore the vehicle can be driven at least to the nearest parking space or even home or to a garage.

A nonreturn valve is preferably provided in each pressure supply circuit, said nonreturn valve being arranged between the intake from the reservoir and the branch to the opening of the hydraulic pump. This obviates the need for a separate valve which shifts when the direction of rotation of the hydraulic pump is switched over but, because of the design, the required fluid can be output only via the opening acting as a delivery outlet.

A roller cell pump or a vane pump is preferably used as the hydraulic pump, thus resulting in a compact design and high efficiency.

According to a refinement of the invention, the gearbox actuator according to the invention can be part of an assembly which has a gearbox for a drive train of a motor vehicle, wherein the gearbox has at least one clutch and a brake, and the gearbox actuator can actuate the at least one clutch and the at least one brake. Owing to its four pressure outlets, the gearbox actuator can activate the different clutches and brakes independently of one another.

It can be provided here that two of the pressure outlets are connected to a respective clutch of the gearbox, and two of the pressure outlets are connected to a respective brake of the gearbox. In particular, it can be provided that the brakes are each assigned to a planetary gear set and the clutches are assigned to an internal combustion engine and/or to an electric motor.

BRIEF DESCRIPTION OF THE DRAWINGS

The invention will be described below with reference to three embodiments which are illustrated in the attached drawings, in which.

DETAILED DESCRIPTION OF THE PREFERRED EMBODIMENTS

Figure 1:
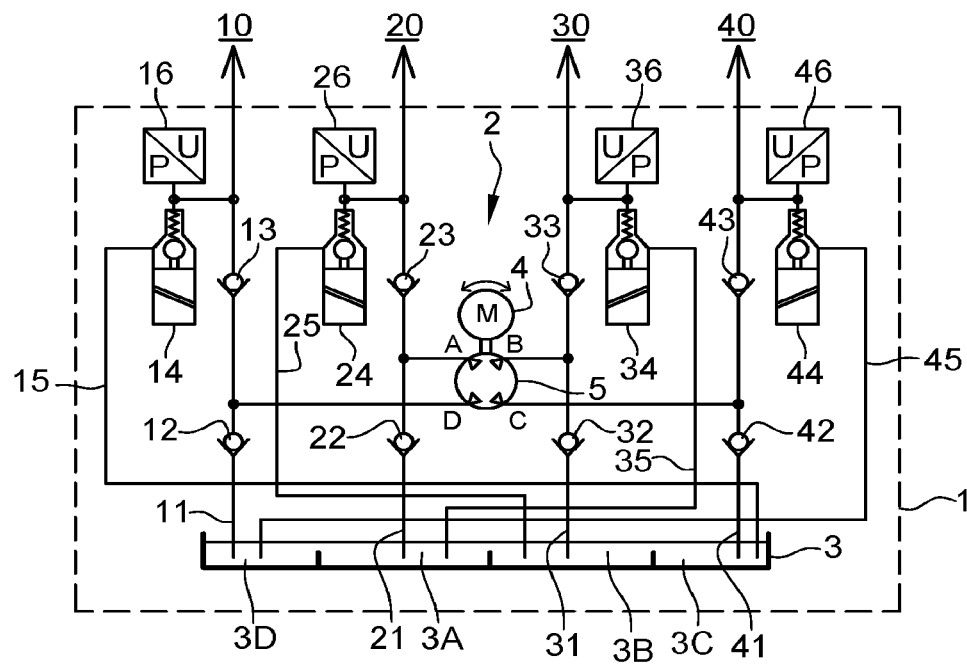
FIG. 1 shows a circuit diagram of a hydraulic gearbox actuator according to a first embodiment of the invention.

FIG. 1 schematically shows a hydraulic gearbox actuator 1 which has a hydraulic pump 2 and a reservoir 3. The reservoir is attached to the hydraulic pump 2, thus forming a compact unit.

The gearbox actuator 1 has four pressure outlets 10, 20, 30, 40 to which corresponding hydraulic lines can be connected, the hydraulic lines leading to pressure pistons with which clutches or brakes of a gearbox can be actuated. Said clutches can be part of a dual clutch gearbox, part of planetary gear sets and/or can serve to connect an electric motor and/or an internal combustion engine to a drive train of a motor vehicle or to disconnect same from the drive train.

In one use example, the pressure outlets 10 and 40 can be used for shifting clutches, and the pressure outlets 20, 30 can be used for shifting brakes with which one of the components from among internal gear, sun gear and planetary carrier of a first and second planetary gear set is secured or released.

The hydraulic pump 2 has an electric motor 4 which constitutes the drive, and a pump body 5. The pump body 5 accommodates a rotor 6 which can be driven in the one or other direction by the electric motor 4 in accordance with the operating direction thereof.

The hydraulic pump is designed as a roller cell pump, and therefore it combines a robust design with a high delivery capacity. The rollers 7 of the roller cell pump can be seen in FIG. 2. They are accommodated in pockets of the rotor 6 and run along the inner contour of the pump body 5.

In the pump body, two working chambers 8, 9 are delimited from each other. Each of the working chambers has two openings A, B or C, D. The openings A, B, C, D are arranged here in such a manner that they are located at the "beginning" and at the "end" of the respective working chamber, as viewed in the circumferential direction.

Figure 2:
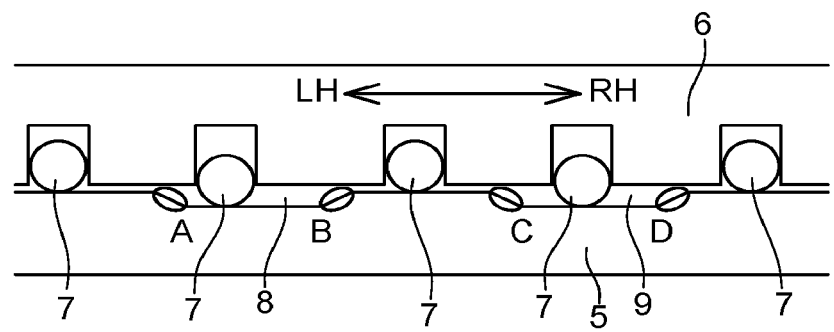
FIG. 2 shows a schematic developed view of the pump body and of the rotor of the hydraulic pump which is used in the gearbox actuator of FIG. 1.

If the rotor 6 is operated in a first direction of rotation, for example the direction RH of FIG. 2, the opening A of the working chamber 8 is located on the intake side while the opening B is located on the delivery side. Accordingly, the opening C is located on the intake side and the opening D on the delivery side in the working chamber 9. Hydraulic fluid is therefore drawn through the openings A, C and output through the openings B, D.

If the hydraulic pump 2 is operated in the opposite direction LH, the function of the openings is reversed: the openings B, D are the intake side of the pump while the openings A, C are the delivery side.

Each opening A, B, C, D leads to a pressure supply circuit of the gearbox actuator. As can be seen in FIG. 1, the opening D is connected to the pressure supply circuit which leads to the pressure outlet 10. The opening A is connected to the pressure supply circuit which leads to the pressure outlet 20. The opening B is connected to the pressure supply circuit which leads to the pressure outlet 30. The opening C is connected to the pressure supply circuit which leads to the pressure outlet 40.

Each pressure supply circuit contains an intake line 11, 21, 31, 41, a first nonreturn valve 12, 22, 32, 42, a second nonreturn valve 13, 23, 33, 43 and a proportional valve 14, 24, 34, 44.

The reservoir 3 is divided into a plurality of chambers 3A, 3B, 3C, 3D which are assigned to the respective openings. The opening A, when it is the intake side of the corresponding working chamber, draws out of the chamber 3A, etc.

The corresponding opening A, B, C, D is connected to "its" pressure supply circuit between the two nonreturn valves 12, 13 or 22, 23; 32, 33; 42, 43. Said nonreturn valves are arranged in such a manner that, if the opening acts as the intake side of the hydraulic pump 2, the hydraulic fluid is then drawn out of the reservoir via the first nonreturn valve 12, 22, 32, 42; the second nonreturn valve 13, 23, 33, 43 is blocked. If the corresponding opening is the delivery side of the hydraulic pump 2, the hydraulic fluid is conveyed to the pressure outlet 10, 20, 30, 40 via the second nonreturn valve 13, 23, 33, 43; the first nonreturn valve 12, 22, 32, 42 is blocked.

The pressure of the corresponding pressure outlet 10, 20, 30, 40 can be controlled with the proportional valves 14, 24, 34, 44. The fluid pressure of the circuit of the pressure outlets 10, 20, 30, 40 can be regulated in conjunction with pressure sensors 16, 26, 36, 46.

If the delivery pressure of the hydraulic pump 2 at the opening A, B, C, D acting as the fluid outlet lies above a predetermined value, the excess hydraulic fluid is returned directly into the reservoir 3.

Use is made for this purpose of a return line 15, 25, 35, 45 which leads to the chamber in the reservoir, from which chamber drawing takes place for the corresponding pressure supply circuit. The return line 15 therefore leads to the chamber 3C, the return line 25 leads to the chamber 3B, the return line 35 leads to the chamber 3A, and the return line 45 leads to the chamber 3D.

Figure 3:
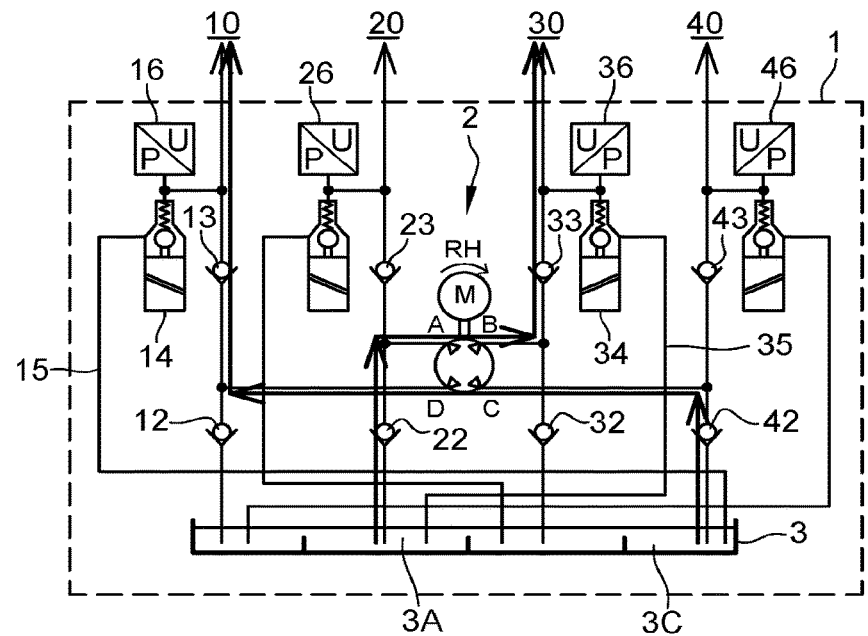
FIG. 3 shows the circuit diagram of FIG. 1, wherein the hydraulic fluid flow is illustrated in a first operating direction of the hydraulic pump.

FIG. 3 shows the operating state of the gearbox actuator in the operating direction RH of the hydraulic pump in which the openings B and D are the delivery sides of the pump. The pressure outlets 10, 30 are supplied with hydraulic fluid, wherein the pressure is controlled or regulated by means of the proportional valves 14, 34. Returned hydraulic fluid passes via the return lines 15, 35 into the chambers 3A and 3C of the reservoir 3. This ensures that, in the event of a leakage in another hydraulic circuit, the unaffected hydraulic circuits still remain operational for some time, and therefore the vehicle can still be safely parked or can even be driven to a garage or home.

Figure 4:
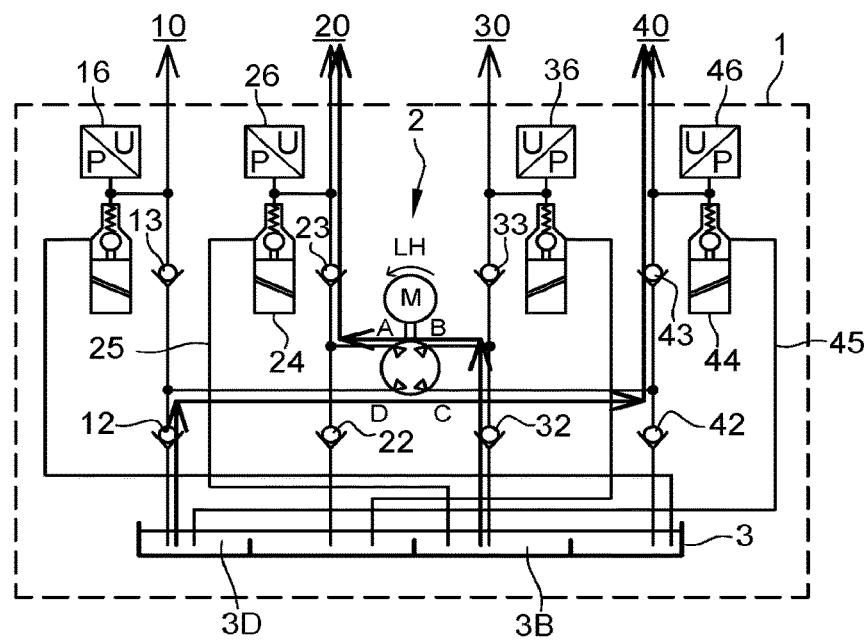
FIG. 4 shows the circuit diagram of FIG. 1, wherein the hydraulic fluid flow is illustrated in a second operating direction of the hydraulic pump.

FIG. 4 shows the operating state of the gearbox actuator in the operating direction LH of the hydraulic pump, in which the openings A and C are the delivery sides of the pump. Accordingly, the pressure outlets 20, 40 are supplied with hydraulic fluid, the pressure of which is controlled or regulated by means of the proportional valves 24, 44. Returned hydraulic fluid passes via the return lines 25, 45 into the chambers 3B and 3D of the reservoir 3.

A common feature of all of the pressure supply circuits of the hydraulic pressure outlets 10, 20, 30, 40 is that a pressure once applied can basically be maintained as long as the corresponding proportional valve 14, 24, 34, 44 is correspondingly activated. This is firstly because the nonreturn valves 13, 23, 33, 43 are free of leakage and secondly because the proportional valves 14, 24, 34, 44 are also free of leakage.

Since each working chamber 8, 9 has only two openings A, B or C, D, a high delivery capacity arises since virtually 180° is available in the circumferential direction for accommodating the two openings of each working chamber.

Figure 5:
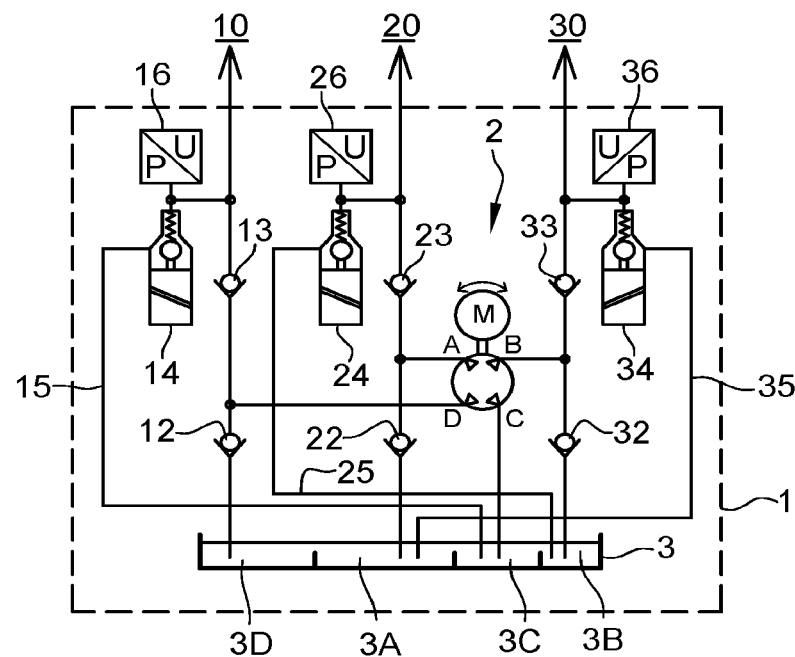
FIG. 5 shows a circuit diagram of a hydraulic gearbox actuator according to a second embodiment of the invention.

FIG. 5 shows a second embodiment. The same reference signs are used for the components which are known from the first embodiment, and to this extent attention is drawn to the above explanation.

The difference between the first and second embodiment consists in that, in the second embodiment, only three pressure outlets 10, 20, 30 are provided.

The opening C is not assigned here to any pressure supply circuit. It draws directly from the reservoir 3.

Figure 6:
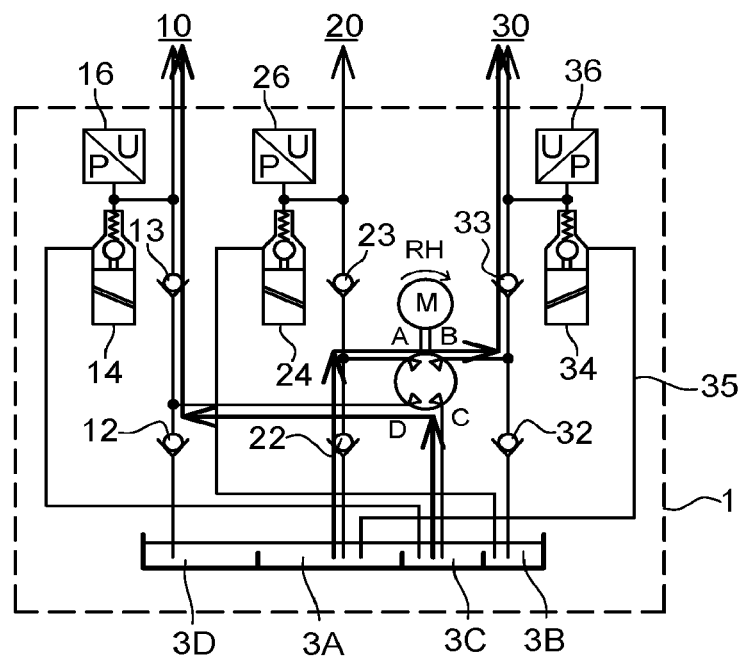
FIG. 6 shows the circuit diagram of FIG. 5, wherein the hydraulic fluid flow is illustrated in a first operating direction of the hydraulic pump.

As shown in FIG. 6, in the first operating direction RH of the hydraulic pump 2, the manner of operation corresponds to that of the first embodiment as illustrated in FIG. 3.

Figure 7:
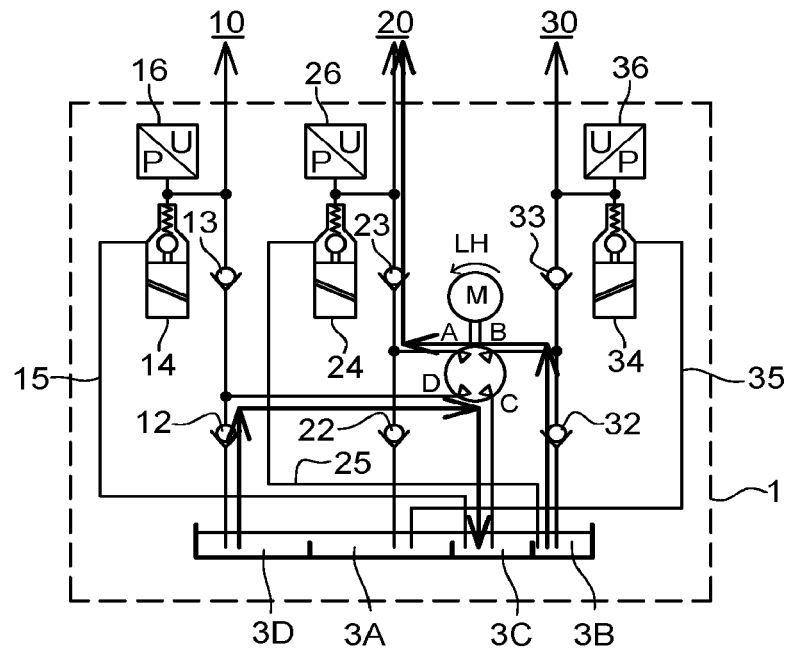
FIG. 7 shows the circuit diagram of FIG. 5, wherein the hydraulic fluid flow is illustrated in a second operating direction of the hydraulic pump.

As shown in FIG. 7, in the second operating direction LH of the hydraulic pump 2, only the second pressure outlet 20 is supplied with hydraulic fluid; the working chamber 9 runs "at no load" since it draws the hydraulic fluid out of the reservoir 3 and directly pumps it back again. However, the chamber from which drawing takes place and the chamber into which the return is made, are different from the previous embodiments.

Figure 8:
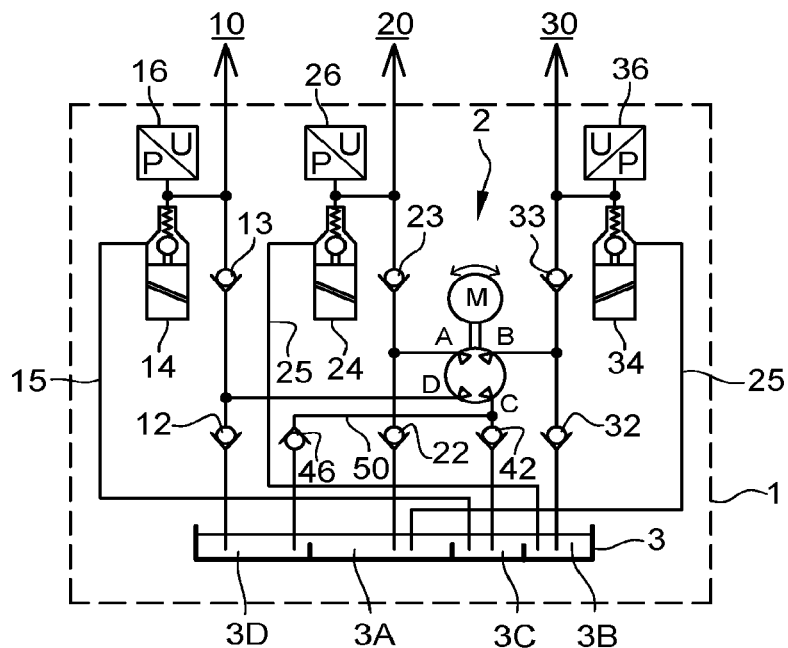
FIG. 8 shows the circuit diagram of a hydraulic gearbox actuator according to a third embodiment of the invention.
Figure 9:
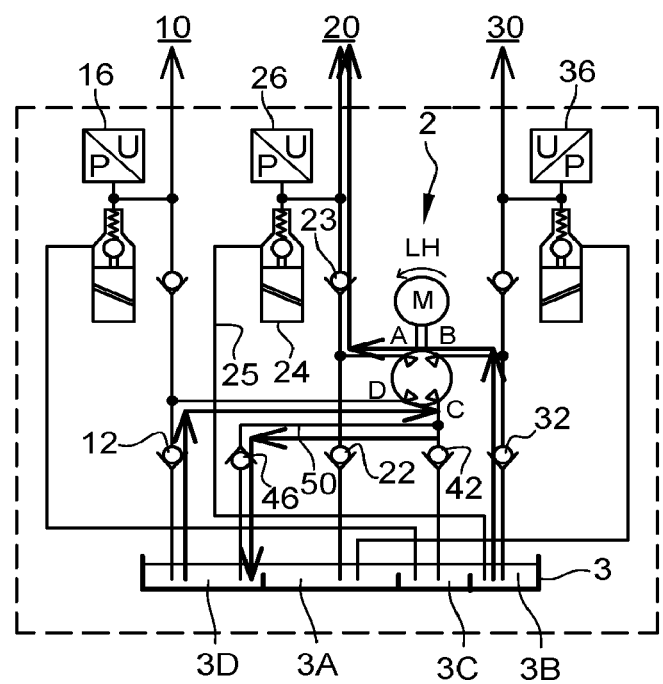
FIG. 9 shows the circuit diagram of FIG. 8, wherein the hydraulic fluid flow is illustrated in a second operating direction of the hydraulic pump.

FIG. 8 shows a third embodiment. The same reference signs are used for the components which are known from the second embodiment, and to this extent attention is drawn to the above explanation.

The difference between the second and the third embodiment consists in that, in the third embodiment, the hydraulic fluid which is pumped through the working chamber 9 in the second operating direction is returned again (as in the first embodiment) into that chamber of the reservoir 3 from which it is also drawn. For this purpose, the circuit to which the opening C is connected branches into an intake circuit with the known nonreturn valve 42 and into a return circuit 50. The latter is provided with a nonreturn valve 46 which acts counter to the first nonreturn valves 12, 22, 32, 42.

The invention claimed is:

1. A hydraulic gearbox actuator comprising a hydraulic pump which has a pump body wherein a rotor is arranged, wherein a drive motor is provided with which the rotor can be driven in opposite directions, wherein two working chambers which are separated from each other are formed in the pump body, said working chambers each having two openings, of which at least three openings are connected to a respective pressure supply circuit, the one side of which is connected to a reservoir and the other side of the respective pressure supply circuit is connected to one of three pressure outlets of the gearbox actuator.

2. The hydraulic gearbox actuator according to claim 1, wherein the fourth opening is directly connected to the reservoir.

3. The hydraulic gearbox actuator according to claim 1, wherein all of the openings are connected to the respective pressure supply circuit, the one side of which is connected to the reservoir and the other side of which is connected to one of four pressure outlets of the gearbox actuator.

4. The hydraulic gearbox actuator according to claim 1, wherein a proportional valve is arranged in each pressure supply circuit between the opening and the pressure outlet.

5. The hydraulic gearbox actuator according to claim 4, wherein the reservoir is divided into separate chambers, and each proportional valve has a return line which leads to the chamber of the reservoir from which the pressure supply circuit which is connected to the same working chamber of the hydraulic pump draws.

6. The hydraulic gearbox actuator according to claim 1, wherein a nonreturn valve is provided in each pressure supply circuit, said nonreturn valve being arranged between an intake from the reservoir and a respective branch to the opening of the hydraulic pump.

7. The hydraulic gearbox actuator according to claim 1, wherein the hydraulic pump is a roller cell pump or a vane pump.

8. An assembly with a hydraulic gearbox actuator according to claim 1 and a gearbox for a drive train of a motor vehicle, wherein the gearbox has at least one clutch and at least one brake, and the gearbox actuator can actuate the at least one clutch and the at least one brake.

9. The assembly according to claim 8, wherein two of the pressure outlets are connected to a respective clutch of the gearbox, and two of the pressure outlets are connected to a respective brake of the gearbox.

10. The assembly according to claim 9, wherein the brakes are each assigned to a respective planetary gear set and the clutches are assigned to an internal combustion engine and/or to an electric motor.

* * * * *